United States Patent [19]

Chilman

[11] 4,411,596
[45] Oct. 25, 1983

[54] RAM AIR TURBINE CONTROL SYSTEM

[75] Inventor: John A. Chilman, Gloucester, England

[73] Assignee: Sundstrand Corporation, Rockford, Ill.

[21] Appl. No.: 133,766

[22] Filed: Mar. 25, 1980

[51] Int. Cl.³ .............................................. F01D 7/02
[52] U.S. Cl. ....................................... 416/51; 416/52; 416/137
[58] Field of Search .................... 416/44 A, 51 A, 50, 416/52, 137, 139, 44 R, 50 A, 51 R, 52 A, 53 R, 139 A

[56] References Cited

U.S. PATENT DOCUMENTS

| | | | |
|---|---|---|---|
| 1,404,403 | 1/1922 | Parker | 416/52 |
| 1,443,664 | 1/1923 | Vischer | 416/52 |
| 2,139,954 | 12/1938 | Hartley | 416/52 |
| 2,777,524 | 1/1957 | Chapman et al. | 416/135 A X |
| 2,955,656 | 10/1960 | Balje et al. | 416/137 |
| 2,988,327 | 6/1961 | Trowbridge et al. | 416/156 X |
| 2,997,109 | 8/1961 | Blackburn | 416/137 |
| 3,013,613 | 12/1961 | Blackburn | 416/50 A |
| 3,469,633 | 9/1969 | Avondoglio | 416/139 X |
| 4,257,736 | 3/1981 | Jacobs | 416/44 A X |

FOREIGN PATENT DOCUMENTS

| | | | |
|---|---|---|---|
| 806442 | 12/1936 | France | 416/52 |
| 845466 | 8/1939 | France | 416/139 |
| 875156 | 9/1942 | France | 416/137 |
| 954440 | 12/1949 | France | 416/52 |
| 1050246 | 1/1954 | France | 416/52 |
| 767907 | 2/1957 | United Kingdom | 416/51 A |

Primary Examiner—Everette A. Powell, Jr.
Attorney, Agent, or Firm—Ted E. Killingsworth; Michael B. McMurry; Harold A. Williamson

[57] ABSTRACT

The present invention relates to an improved blade pitch control mechanism for an air driven turbine blade mounted for rotation in a hub assembly. The control mechanism includes a drive member mounted for reciprocation along a central axis of the hub assembly. The drive member has a control member secured to one end and a seat member at the other end. The blade has operatively coupled thereto, a centrifugally responsive means which includes a pin in mating engagement with the control member. A spring is positioned between the hub assembly and the control member to thereby cause the blade to assume a coarse or high pitch position when the blade and hub assembly are in storage. A slide member is mounted on a portion of the hub assembly for reciprocation along the central axis. A spring is positioned between the seat member and the slide member. A flyweight is supported on the hub assembly and engages the slide member. Rotation of the hub assembly causes the flyweight to move the slide member and thereby move the blade pitch from coarse pitch to fine pitch and thereafter, allow the centrifugally responsive means to control the blade pitch.

25 Claims, 3 Drawing Figures

1

RAM AIR TURBINE CONTROL SYSTEM

TECHNICAL FIELD

This invention relates to an improvement in ram air turbine blade control.

BACKGROUND ART

For many years, aircraft have included as standard equipment backup power supplied for use in times of power outage in the form of air driven turbines or fans which are lowered into the airstream, thereby making use of the relative speed of the aircraft through the ambient air to cause the turbine blades or propellers to rotate. The rotation imparted to the blades due to their movement through the air is then used to drive electrical generating gear or provide hydraulic power to the aircraft hydraulic system during the aforementioned times of power outages. These air driven propeller arrangements conventionally include governor mechanisms that attempt to control the output rotational speed delivered from the propellers to electrical or hydraulic units that are designed to operate most efficiently at a set or given speed.

Typical of the best efforts of the past is that of Blackburn as evidenced by U.S. Pat. No. 3,013,613 ('613) and Blackburn et al, U.S. Pat. No. 2,876,847 ('847).

Blackburn ('613) depicts an arrangement where the governor control mechanism has, as best seen, in FIG. 1 and FIG. 3, governor flyweights 64 which are connected via a pair of pins 74, 78 and link 76, respectively, to the flyweight 67 and a slider assembly 42. The slider assembly 42, in turn, has a pair of pins 80 which are connected to the inner ends of links 82, the outer ends of links 82 being rotatably connected to crank pins 84. The cranks pins 84 are carried by crank arms 86 which are drivingly connected with a stub shaft 60, which stub shaft is secured to the blade, the pitch of which is to be controlled. Auxiliary counterweights 70 are also rigidly attached to each stub shaft 60. The invention to be described more fully, hereinafter, does away with virtually all of the pins and linkages required in Blackburn ('613), which results in an inherently more efficient device for controlling blade pitch in response to blade speed.

Blackburn et al ('847) holds special interest because this patent puts forth the idea of providing coarse or high pitch blade positioning for the propeller involved when the entire unit is stationary or in storage. Blackburn et al ('847) accomplishes coarse pitch positioning of a blade or propeller 31 by incorporating a coiled extension spring 56 which is wound around the root of the propeller blade and secured to pins 55, 63 such that, when the unit is stationary the coiled extension spring 56 will contract and rotate the blades 31 to a high or coarse pitch position. The invention to be described hereinafter, does away with need to bend a coiled extension spring, but relies on the direct transmission of the stored energy in a compressed spring which energy is delivered in a straight line fashion to and through a pin and yoke arrangement to the blade to be controlled.

DISCLOSURE OF INVENTION

The present invention relates to an improved blade pitch control mechanism for an air driven propeller or turbine blade mounted for rotation in a hub assembly. The control mechanism includes a drive member mounted for reciprocation along a central axis of the hub assembly. In the preferred embodiment of the invention, the drive member has a control member secured to one end and a seat member at the other end. The blade has operatively coupled thereto, a centrifugally responsive means which includes a pin in mating engagement with the control member. A spring is positioned between the hub assembly and the control member to thereby cause the blade to assume a coarse or high pitch position when the blade and hub assembly are in storage. A slide member is mounted on a portion of the hub assembly for reciprocation along the central axis. A spring is positioned between the seat member and the slide member. A flyweight is supported on the hub assembly and engages the slide member. Rotation of the hub assembly causes the flyweight to move the slide member and thereby move the blade pitch from coarse pitch to fine pitch and thereafter, allow the centrifugally responsive means to control the blade pitch.

In one embodiment of the invention, the centrifugally responsive means takes the form of counterweights secured to the blade and in another embodiment of the invention, the centrifugally responsive means contemplates the incorporation of a centrifugally responsive weight pivotally secured to the hub assembly and having a portion thereof engaging the control member.

It is, therefore, a primary object of this invention to provide improved blade pitch control mechanism in which axially arranged springs coincident with the central axis of the air driven turbine blades, cooperate with a minimal number of mechanical components thereby affecting in a highly efficient manner, the adjustment of blade pitch.

Another object of this invention is to provide an improved governor and blade pitch control mechanism for use with an air driven turbine without the need for motion transmitting linkages and pins, thereby resulting in a highly responsive governor and blade pitch control mechanism with reduced mechanical hysteresis loses.

Yet another object of this invention is to provide an improved governor and blade pitch control mechanism that allows blades during storage to remain at a coarse pitch position, thereby enhancing the mechanism's ability to withstand sudden shock forces to the blades in the event that the control mechanism becomes frozen while in storage, or should there be a governor spring failure.

Still yet another object of the invention is to provide plural blade pitch control forces by utilizing in conjunction with the blade counterweights secured thereto, pivotally mounted centrifugally responsive weights operatively connected to the blade which is to be controlled.

In this attainment of the foregoing objects, the invention contemplates an air driven turbine or propeller blade that includes a hub assembly that has a central longitudinal axis rotatably mounted on a support and drivingly connected to an output shaft. The blade is mounted for rotation in the hub assembly. A blade pitch control mechanism is provided with a governor drive member mounted for rotation and reciprocation, respectively, about and along the central longitudinal axis. In the preferred embodiment of the invention, the governor drive member is provided with a yoke or control member at one end and a spring seat member at the other end.

The blade has secured thereto, a centrifugally responsive means which includes an eccentric pin secured to the centrifugally responsive means. The pin is in mating engagement with the yoke. A spring is positioned between a portion of the hub assembly and the yoke to thereby cause the blade to assume a coarse pitch position when the blade and hub assembly are in storage. A governor slide member is mounted on a portion of the hub assembly for rotation and reciprocation, respectively, about and along the central longitudinal axis. A spring is positioned between the spring seat member and the governor slide member. A flyweight is pivotally mounted on the hub assembly and has a portion thereof engaging the governor slide, such that rotation of the hub assembly causes the flyweight to move the governor slide assembly and thereby move the blade pitch from coarse pitch to fine pitch and thereafter, allow the centrifugally responsive means to control the blade pitch.

In another embodiment of the invention, the centrifugally responsive means includes a counterweight secured to the blade with the pin secured to the counterweight. In addition, a centrifugally responsive weight is pivotally secured to the hub assembly. The centrifugally responsive weight has a portion thereof engaging the yoke.

Other objects and advantages of the present invention will be apparent upon reference to the accompanying description when taken in conjunction with the following drawings:

BRIEF DESCRIPTION OF DRAWINGS

Reference is now made to FIG. 1 which depicts in a three dimensional fashion, the manner in which the ram air driven turbine blade and control mechanism shown in solid line is secured to a depending strut arrangement shown in dotted outline. When the ram air turbine is not in use, it is drawn back into the fuselage of the aircraft, not shown. In FIG. 1, the blades 11, 11a are shown in their coarse pitch position. The apparatus to be described more fully, hereinafter, will explain the means by which the blades 11, 11a are placed in the coarse or high pitch position for storage purposes, and how the control mechanism of the invention moves the blades 11, 11a from a coarse pitch to a fine pitch, and thereafter provides blade pitch control to affect a constant speed output. The blades 11 are rotatably mounted in a hub assembly 12, and a cover 15 is shown secured to the hub assembly by screws, such as 15a.

Figure 1:
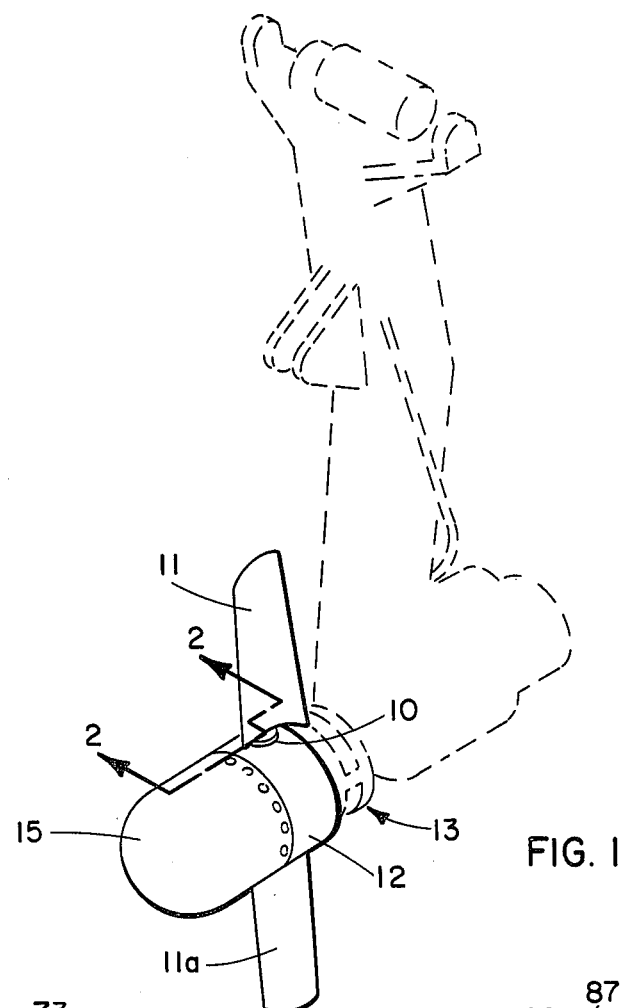
FIG. 1 is a three dimensional perspective view of a ram air turbine blade assembly embodying the invention.
Figure 2:
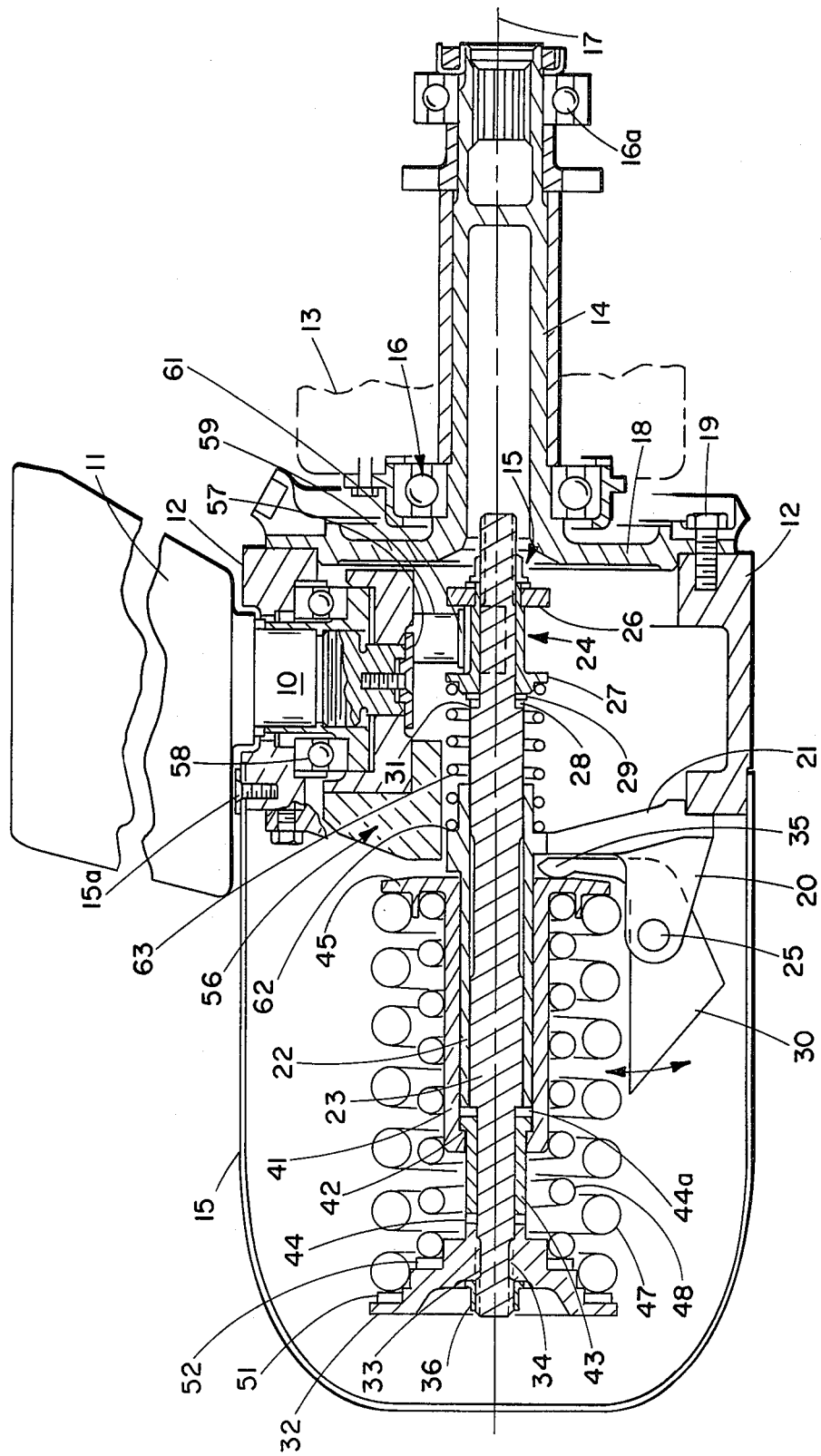
FIG. 2 is a section of the turbine blade assembly of FIG. 1 taken along line 2—2.

Reference is now made to FIG. 2 which illustrates the preferred embodiment of the invention, and shows in section, a ram air turbine blade assembly of the type shown in solid line in FIG. 1. In this figure, only blades 11 and the control mechanism, therefore, are illustrated. It is to be understood that the blade 11a of FIG. 1 would be provided with the same control mechanisms as will now be described in respect of blade 11. A blade 11 is shown rotatably mounted in a hub assembly 12. The hub assembly 12 is, in turn, rotatably mounted on a support 13 shown in dotted outline. The hub assembly 12 has a driveshaft 14 supported for rotation in ball bearings 16, 16a. The hub assembly 12 rotates about central longitudinal axis 17. The hub assembly 12 is provided with an end plate 18 secured about its periphery thereto, by machine bolts, such as machine bolt 19. The end plate 18 is integrally formed with drive shaft 14 such that the hub assembly 12 and drive shaft 14 rotate about central longitudinal axis 17. The drive shaft, though not shown in the drawings, is drivingly connected to a device to be driven, such as but not limited to a generator or hydraulic unit. The hub assembly 12 is provided with a support section 21 which has, in turn, formed integrally therewith a tubular hub assembly support member 22. Mounted within the tubular hub assembly 22 for reciprocating motion is a governor driveshaft or drive member 23. The governor drive member 23 can reciprocate and also rotate. At the right-hand end of governor driveshaft 23, as FIG. 2 is viewed, there is a yoke arrangement 24 secured thereto. The yoke 24 is made up of a plate 26 which plate is held snuggly against a shouldered spring seat element 27. A self-locking nut and washer arrangement 15 firmly secures the yoke 24 in place on the governor drive member 23. Shims 28 and 29 are provided between the shouldered spring seat element 27 and a shoulder portion 31 of the governor drive member 23. At the left-hand end of the governor drive member 23, there is a spring seat member 32 secured by threads 33, 34 to the governor driveshaft 23. The spring seat member 32 is held in place by self-locking nut 36. A governor slide member 41 is shown surrounding tubular hub assembly support member 22. Governor slide member 41 can move to the left as shown in this figure. Movement of the governor slide member to the right is controlled by stop lip 42 as it meets and abutts with a lip formed at the end of tubular shaft element 43. The tubular shaft element 43 is shown separated from spring seat member 32 by shim 44 and tubular hub assembly 22 by shim 44a. The governor slide member 41 includes an annular flange 45 against which a helical compression springs 47, 48 abut as shown. At the left-hand end of helical compression springs 47, 48, there are shown interposed between the spring seat member 32, thrust bearings 51, 52. The support section 21 of hub assembly 12 includes a pivot pin support member 20 which has disposed there through, as shown, a shaft pin 25. Mounted on the pivot pin 25, for pivotal movement therewith, is flyweight 30 which includes a contact arm 35. It will be appreciated that rotary motion about the central longitudinal axis 17 will cause flyweight 30 to move outwardly, resulting in contact arm 35 asserting a force on annular flange 45 which, in turn, tends to compress the springs 47, 48 which, in turn, acting through spring seat member 32, causes governor drive member 23 to move to the left.

In the upper portion of the housing, as viewed in this FIG. 2, it will be observed that the blade 11 has a root section 10 which passes through the hub assembly 12 and is secured to a counterweight assembly 56 by means of a bolt 57. The counterweight assembly 56 acts to balance out the centrifugal twisting moment of blade 11 and provide additional effort to move the blades to coarse pitch. The counterweight 56 is keyed to root portion 10, as is shown, for rotation therewith. The blade 11 with its root portion 10 is mounted for rotary motion in the hub assembly 12 and is supported in place by thrust bearings 58. The counterweight 56 has integrally secured therewith a downwardly extending eccentrically positioned pin 59 having a cam follower end portion 61. The cam follower end portion 61 is in mating engagement with the yoke 24 as shown. A helical compression spring 63 is shown positioned between a shouldered portion 62 of the hub assembly 12 and the shouldered spring seat element 27. The helical compression spring 63 functions when the arrangement is at rest to force the shouldered spring seat element 27 and mating pin 59 with cam follower end portion 61 to rotate counterweight 56 and blade 11 to a coarse or high pitch position for storage.

In operation the blade 11, while in storage, is in the coarse pitch position shown. The initial action of the air passing the blade 11 is to induce a high starting torque, which torque is transmitted throughout the blade root 10 to the hub assembly 12. As the hub assembly begins to rotate, the flyweight 30 is also rotated along with the hub assembly 12. The flyweight 30 experiences increased centrifugal force with increased speed which results in contact arm 35 moving annular flange 45 to the left as FIG. 2 is viewed. This movement to the left is transferred through helical compression springs 47, 48; spring seat member 32 and drive member 23. The yoke 24 secured to the drive member 23 and in sliding contact with the cam follower 61 of counterweight pin 59 causes the blade 11 secured to the counterweight 56 to rotate the blade 11 initially towards a fine pitch position. As the entire unit comes up to operating speed, the counterweight 56 acts to control the blade pitch by compressing the springs 47, 48.

Figure 3:
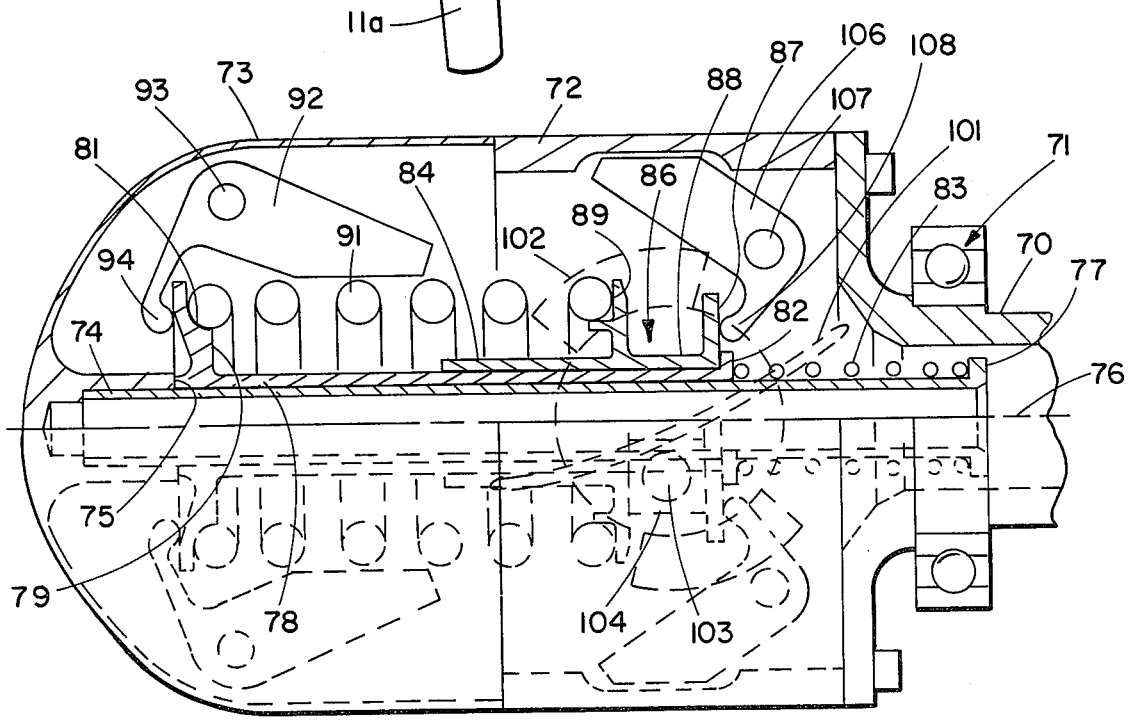
FIG. 3 is a partial section of a schematic illustration of a second embodiment of the invention.

Reference is now made to FIG. 3 which illustrates in partial section another embodiment of the invention. FIG. 3 is schematic in nature in that such matters as bearings etc. are not shown.

In FIG. 3, the hub assembly 72 and cover 73 cooperate to center and support a tubular hub assembly support member 74, which support member 74 extends along central longitudinal axis 76. The hub assembly 72 is supported for rotation on bearings 71. A driveshaft 70 is secured to the hub assembly 72 in the same manner as the related component described in respect of FIG. 2. A shouldered stop 75 is integrally formed as shown in cover 73. Support member 74 has an annular lip spring seat lip 77 at the right-hand end thereof. A governor slide member 78 is mounted for reciprocation on tubular hub assembly support member 74. At the left hand end of the governor slide member 78 is an integrally secured annular flange 79 which has, at its outer periphery, a spring seat contour 81. The right-hand end of governor slide member 78 terminates with an outwardly extending flange 82 as shown. A helical compression spring 83 is positioned between annular spring seat lip 77 and flange 82 to thereby act upon governor slide member 78.

Concentrically mounted for reciprocation on the governor slide member 78 is drive member 84 which has a yoke 86 integrally formed therewith. The yoke 86 is fashioned of a plate 87, a tubular midsection 88 and a spring seat member 89. A helical compression spring 91 is fitted between annular flange 79 having spring seat contour 81 and spring seat member 89. A flyweight 92 is supported by pivot pin 93. The pivot pin 93 is secured to a portion of the cover 73, not shown.

The turbine blade 101, shown in broken line fashion, is secured to counterweight member 102 in the same fashion that blade 11 of FIG. 2 was secured to counterweight assembly 56. An eccentrically positioned pin 103, having slider block 104, is integrally secured to counterweight 102 and fitted for sliding motion in yoke 86.

In the FIG. 3 embodiment of the invention, there is provided an additional centrifugal flyweight 106 mounted on pin 107, which pin 107 is secured to hub assembly 72 by means not shown. The counterweight 106 has a contact arm 108 that engages plate 87 of yoke 86. The utility of centrifugal counterweight 106 will be explained more fully hereinafter.

As was noted earlier, FIG. 3 shows diagrammatically a turbine in which the blade 101 together with counterweight 102 and eccentric pin 103 are rotationally mounted about the central axis 76. The yoke 86 is slidingly mounted on the governor slide member 78 and is arranged to engage the eccentric pin 103 such that axial movement of the yoke 86 causes rotational motion of the blade 101.

The drive member 84, yoke 86, spring 91 and governor slide member 78 form an assembly slidingly mounted on the tubular hub assembly support member 74. Helical compression spring 83 holds the assembly, just noted, against the stop 75 thereby holding the blade 101 in the coarse pitch position when the ram air turbine is at rest or storage. On ejection, the flyweight 92 begins to apply pressure via contact arm 94 to annular flange 79 of the governor slide member 78, and as the speed increases, moves the yoke 86 via spring 91 to the right resulting in the eccentric pin 103 with slider block 194 moving to the right in an arcuate sense, causing the blade 101 to move to a fine pitch position. This just mentioned movement to the right is opposed by helical compression spring 83. The effect from this movement of flyweight 92 is such that it causes the blade 101 to move to its outer most fine pitch position at a speed below the designed governing speed.

As the speed increases, the centrifugal flyweight 106, or alternatively, the counterweight 102 which provides a force in the same sense, or a combination of both are used as the speed reaches the designed governed speed. The effect of these weights, when acted upon by centrifugal force, is to provide an effort that exceeds the compression force necessary to compress helical compression spring 91, and these move the blades to a position at which rotational equalibrium is established. When the air flow passed the turbine blade 101 is removed, the turbine will stop rotating, and the helical compression spring 83 will then return the entire assembly including the blade 101 to a coarse pitch starting position.

From the foregoing description, it is apparent that the invention described provides an improved blade pitch control mechanism in which axially arranged springs coincident with the central axis of the air driven turbine blades, cooperate with minimal number of mechanical components, thereby affecting in a highly efficient manner the adjustment of blade pitch. The reduced number of mechanically connected components provides, inherently, fewer mechanical hysteresis loses than has been achieved by the prior art to date.

Although this invention has been illustrated and described in connection with the particular embodiments illustrated, it will be apparent to those skilled in the art that various changes may be made therein without departing from the spirit of the invention as set forth in the following claims.

I claim:

1. A blade pitch control mechanism for a ram air driven turbine blade mounted for rotation in a hub assembly, said mechanism including:

a drive member mounted for reciprocation along a central axis, said drive member having a control member and a seat member secured to said drive member;

said blade having operatively coupled thereto a centrifugally responsive means which includes a pin in mating engagement with said control member;

biasing means acting between said hub assembly and said control member to thereby cause said blade to assume a coarse pitch position when said blade and hub assembly are in storage;

a slide member mounted on a portion of the hub assembly for reciprocation along said central axis and having a resilient means between said seat member and said slide member, and flyweight means supported on said hub assembly and engaging said slide member, rotation of said hub assembly causes said flyweight means to move said slide member and thereby move the blade pitch from coarse pitch to fine pitch, and thereafter allow said centrifugally responsive means to control the blade pitch.

2. The blade pitch control mechanism of claim 1, wherein said central axis is longitudinal, and said hub assembly is rotatably mounted on a support and drivingly connected to an output shart.

3. The blade pitch control mechanism of claim 2, wherein said control member is a yoke that cooperates with said pin to form a motion translating mechanism.

4. The blade pitch control mechanism of claim 3, wherein said biasing means and said resilient means are both springs.

5. The blade pitch control mechanism of claim 4, wherein said centrifugal flyweight means support is in the form of a pivotal connection.

6. The blade pitch control mechanism of claim 5, wherein said control member is secured to one end of said drive member and said seat member is secured to the other end of said drive member.

7. The blade pitch control mechanism of claim 6, wherein said baising means is positioned between said hub assembly and said control member.

8. The blade pitch control means of claim 3, wherein said centrifugally responsive means is a counterweight.

9. The blade pitch control mechanism of claim 8, wherein said pin is secured to said counterweight and positioned eccentrically with respect of the axis of rotation of the blade.

10. The blade pitch control means of claim 1, wherein said centrifugally responsive means is a centrifugal responsive weight pivotally supported on said hub assembly and includes a portion thereof engaging said control member.

11. The blade pitch control mechanism of claim 1, wherein said centrifugally responsive means includes a counterweight secured to said blade with said pin secured to said counterweight, and a centrifugally responsive weight pivotally secured to said hub assembly, said centrifugally responsive weight having a portion thereof engaging said control member.

12. A control system for a ram air driven turbine blade mounted for rotation in a hub assembly having a central axis, comprising:

a blade pitch control mechanism having a governor drive member mounted for reciprocation along said central axis, said governor drive member having a control member and a seal member secured to said drive member;

said blade having secured thereto a centrifugally responsive means which includes a pin secured to said centrifugally responsive means and in mating engagement with said control member;

biasing means acting between a portion of said hub assembly and said control member to thereby cause said blade to assume a coarse pitch position when said blade and hub assembly are in storage;

a governor slide member mounted on a portion of the hub assembly for reciprocation along said central axis;

resilient means positioned between said seat member and said governor slide member;

flyweight means supported on said hub assembly and having a portion thereof engaging said governor slide member, rotation of said hub assembly causes said flyweight means to move the governor slide member and thereby move the blade pitch from coarse pitch to fine pitch, and thereafter allow said centrifugally responsive means to control the blade pitch.

13. The control system of claim 10, wherein said centrifugally responsive means is a counterweight.

14. The control system of claim 11, wherein said pin is secured to said counterweight and positioned eccentrically with respect of the axis of rotation of the blade.

15. The control system of claim 14, wherein said yoke member is secured to one end of said drive member and said seat member is secured to the other end of said drive member.

16. The control system of claim 15, wherein said biasing means is positioned between said hub assembly and said yoke member.

17. The control system of claim 12, wherein said centrifugally responsive means is a centrifugal responsive weight pivotally supported on said hub assembly and includes a portion thereof engaging said control member.

18. The control system of claim 12, wherein said centrifugally responsive means includes a counterweight secured to said blade with said pin secured to said counterweight, and a centrifugally responsive weight pivotally secured to said hub assembly, said centrifugally responsive weight having a portion thereof engaging said control member.

19. A ram air propeller blade assembly comprising:

a hub assembly having a central longitudinal axis rotatably mounted on a support and drivingly connected to an output shaft;

a propeller blade mounted for rotation in said hub assembly;

a blade pitch control mechanism having a governor drive member mounted for rotation and reciprocation, respectively, about and along said central longitudinal axis, said governor drive member having a yoke member and a spring seat member secured to said drive member;

said blade having secured thereto a centrifugally responsive means which includes an eccentric pin secured to said centrifugally responsive means and in mating engagement with said yoke;

biasing means acting between a portion of said hub assembly and said yoke to thereby cause said blade to assume a coarse pitch position when said blade and hub assembly are in storage;

a governor slide member mounted on a portion of the hub assembly for rotation and reciprocation, respectively, about and along said central longitudinal axis;

spring means positioned between said spring seat member and said governor slide member;

flyweight means pivotally mounted on said hub assembly and having a portion thereof engaging said governor slide assembly, such that rotation of said hub assembly causes said flyweight means to move the governor slide assembly and thereby move the blade pitch from coarse pitch to fine pitch, and thereafter allow said centrifugally responsive means to control the blade pitch.

20. The air driven propeller blade of claim 19, wherein said centrifugally responsive means is a counterweight.

21. The air driven propeller blade of claim 20, wherein said pin is secured to said counterweight and positioned eccentrically with respect of the axis of rotation of the blade.

22. The air driven propeller blade of claim 20, wherein said yoke member is secured to one end of said drive member and said seat member is secured to the other end of said drive member.

23. The air driven propeller blade of claim 21, wherein said biasing means is positioned between said hub assembly and said yoke member.

24. The air driven propeller blade of claim 19, wherein said centrifugally responsive means is a centrifugally responsive weight pivotally supported on said hub assembly and includes a portion thereof engaging said yoke member.

25. The air driven propeller blade of claim 19, wherein said centrifugally responsive means includes a counterweight secured to said blade with said pin secured to said counterweight, and a centrifugally responsive weight pivotally secured to said hub assembly, said centrifugally responsive weight having a portion thereof engaging said yoke.

* * * * *